May 27, 1969 J. R. PRENDERGAST 3,446,611
APPARATUS FOR CENTRIFUGALLY CASTING GLASS ARTICLES
Filed Dec. 20, 1965 Sheet 1 of 2
FIG. 1
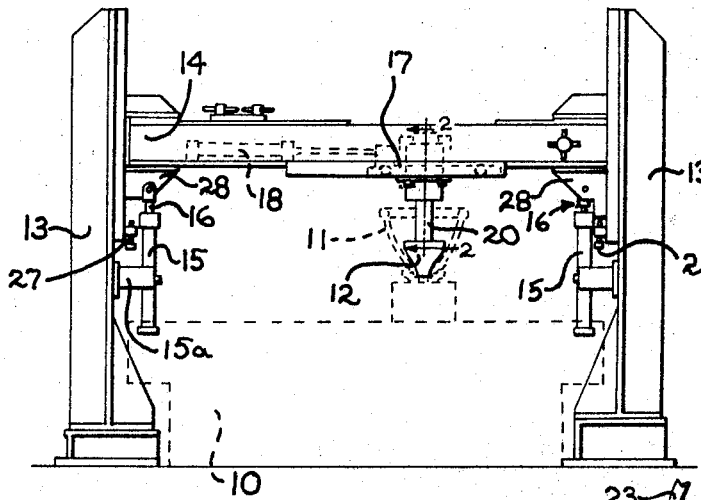
FIG. 2
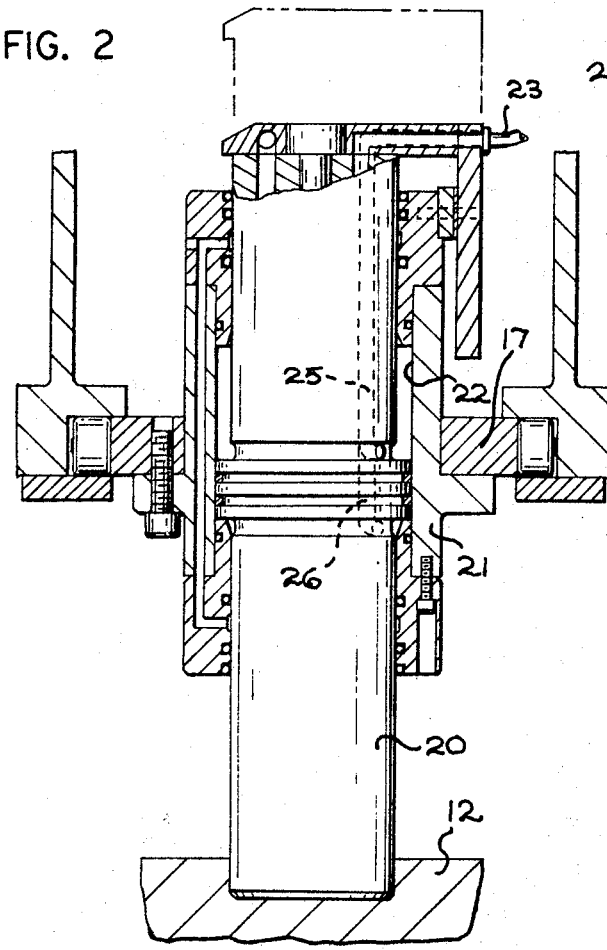
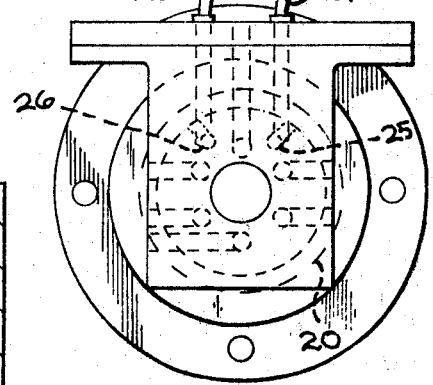
FIG. 3
INVENTOR.
JOHN R. PRENDERGAST
BY
E. J. Holler &
W. A. Schaich
ATTORNEYS

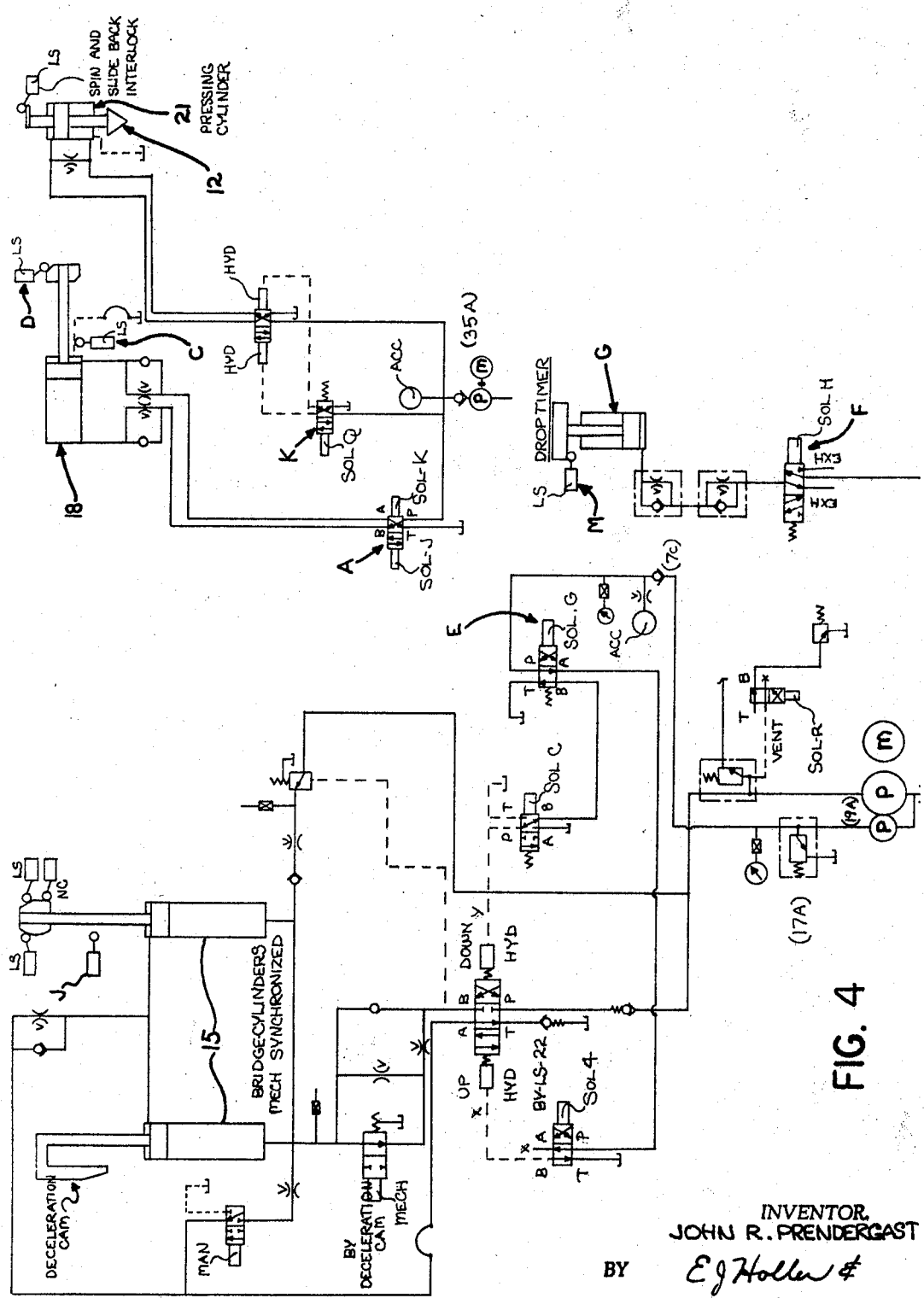

United States Patent Office 3,446,611
Patented May 27, 1969

3,446,611
APPARATUS FOR CENTRIFUGALLY CASTING GLASS ARTICLES
John R. Prendergast, Columbus, Ohio, assignor to Owens-Illinois, Inc., a corporation of Ohio
Filed Dec. 20, 1965, Ser. No. 514,815
Int. Cl. C03b 19/04
U.S. Cl. 65—302
11 Claims

ABSTRACT OF THE DISCLOSURE

An apparatus for centrifugally casting glass in an open top rotatable mold comprising a vertically movable bridge supported by a pair of spaced columns, a pressing plunger vertically movable independently of the bridge into the mold and positive step means to limit the downward movement of the ends of the bridge.

This invention relates to apparatus for centrifugally casting glass articles and particularly glass articles such as the funnel member of a glass cathode ray tube envelope or the like by a combined press and spin process.

In the patent to Prendergast et al. 3,132,018, issued May 5, 1964, there is disclosed and claimed a glass shaping apparatus which includes an open top mold rotatable about a vertical axis and defining an apex portion adjacent the lower extremity thereof. A vertically movable beam or bridge is supported by a pair of spaced columns for vertical displacement relative to the mold. The bridge carries a depending pressing plunger which is insertable axially into the mold into pressing contact with a molten glass gob previously dropped into the mold and is retractable out of contact with the glass gob prior to centrifugal formation of the glass articles following the pressing operation. This pressing plunger is displaceable laterally in a direction longitudinally of the beam and displaceable vertically with the beam, the longitudinal displacement moving the pressing plunger from axial alignment with the mold to permit the dropping of the molten gloss gob into the mold.

The apparatus disclosed in Patent 3,132,018 also includes a fluid pressure actuated control system which is sequence operated to carry out the various steps of the process, including movement of the pressing plunger laterally out of axial alignment with the mold to accommodate the introduction of the glass gob into the mold, displacement of the plunger into axial alignment with the mold, concurrent lowering of the beam and the pressing plunger to press form a portion only of the gob intermediate the pressing plunger and the mold, the concurrent retraction of the pressing plunger out of contact with the gob and, finally, the initiation of rotation of the mold for centrifugally forming the non-press formed portions of the envelope.

Although such apparatus operates effectively to press and centrifugally cast the hollow article, occasionally errors in movement of the beam or bridge occur because of the inability to accurately control the movement of each end of the bridge so that as a result the pressing may be uneven and improper.

It is therefore an object of the invention to provide an improved centrifugal casting apparatus which obviates this problem.

Basically, the invention comprises providing positive stop means for the bridge so that the bridge is moved downwardly against positive stops and mounting the plunger on the carriage for independent vertical movement relative to the carriage so that the plunger can be moved downwardly after the beam engages the stops to press the desired portion of the glass gob.

In the drawings:

FIG. 1 is a side elevational view of an apparatus embodying the invention.

FIG. 2 is a fragmentary sectional view on an enlarged scale taken along the line 2—2 in FIG. 1.

FIG. 3 is a fragmentary plan view of a portion of the apparatus shown in FIG. 2.

FIG. 4 is a schematic diagram of the hydraulic and pneumatic control system for the apparatus.

Referring to FIG. 1, the apparatus is adapted to be used in connection with a rotatable mold table 10 which supports a plurality of open top molds 11 that are movable in succession through various stages of the apparatus. At one station, a gob of glass from a forehearth feeder (not shown) is delivered downwardly into each mold 11 and a plunger 12 is thereafter moved into contact with the glass gob to press the yoke or beam clearance area of the desired funnel member that is being formed.

The apparatus includes a pair of spaced columns 13 on which a bridge or beam 14 is mounted for vertical sliding movement. Cylinders 15 are mounted on columns 13 and have their pistons 16 connected to the beam so that when the fluid is applied to the cylinders, the beam 14 may be raised or lowered. A carriage 17 is mounted on the beam for horizontal movement so that the carriage 17 can be moved out of the path of a gob of glass which is delivered downwardly through an opening in the beam 14 and thereafter can be moved into overlying relationship with the mold 11. The movement of the carriage 17 is controlled by a hydraulic cylinder 18. The aforementioned construction is more fully described in the aforementioned Patent 3,132,018.

In accordance with the invention, the plunger 12 is not mounted directly on the carriage 17 but, as best shown in FIG. 2, is supported on a piston 20 of a cylinder 21 that, in turn, is mounted on the carriage 17. The plunger 12 is assembled in properly oriented position and is not rotatable during operation. This may be contrasted to the structure shown in the aforementioned Patent 3,132,018 wherein the plunger is rotatable relative to the carriage.

More specifically, the piston 20 is movable upwardly and downwardly in the chamber 22 of the cylinder 21 by the application and removal of fluid through lines 23, 24 shown in FIG. 3. As shown, lines 23, 24 communicate respectively with passages 25, 26 in the piston. Passage 25 communicates with one side of the piston and passage 26 with the other so that by applying fluid alternately to the lines 23, 24, the piston 20 can be raised or lowered.

Further, in accordance with the invention, positive stops 27 in the form of threaded bolts are provided on vertical slides 28 on which bridge 14 is supported and which move with the bridge. The slides 28 are adapted to engage brackets 15a which support cylinders 15 to positively stop the movement of the bridge 14 downwardly.

In operation, the carriage 17 is out of position overlying the mold and the bridge 14 is in its uppermost position. A gob of glass is delivered downwardly through the opening in the bridge 14 into the mold 11 and the carriage 17 is thereafter actuated by the cylinder 18 to bring the carriage 17 into overlying relationship with the mold 11. The bridge 14 is then lowered against the stops 27 by the cylinders 15. Subsequently, the piston 20 is actuated to move the plunger 12 downwardly. This presses the glass. The piston 20 is then elevated and the bridge 14 is raised to move the plunger out of the path of the mold 11 so that the mold can be moved to the next successive station.

By the above arrangement, the critical area of the funnel member is pressed accurately and there is no error introduced because of possible binding in the movement of the bridge. Since the bridge moves downwardly against positive stops, it is moved to the same position on each stroke. Accordingly, the subsequent movement of the plunger, being controlled by a single hydraulic cylinder, is in a straight vertical direction. The extent of penetration of the plunger into the mold depends upon the size and condition of the charge of glass.

The system for controlling the operation of the apparatus is substantially the same as shown in the aforementioned Patent 3,132,018 with the additional modification of providing for control of the cylinder 21 after the bridge 14 engages the stops.

Referring to FIG. 4, which is a schematic diagram of a portion of the hydraulic and pneumatic control system for the apparatus. Upon indexing of the mold table 10, the valve A is operated to cause the slide cylinder 18 to retract the carriage 17 and withdraw the plunger 12 from its position overlying the mold 11 to permit a gob of glass to drop downwardly into the mold. When fully retracted, the carriage 17 actuates a limit switch C which again operates valve A to return the carriage to its position overlying the mold. When the plunger 12 is again in position over the mold, a limit switch D is closed operating two valves E, F. Valve F causes the drop timer G to fall and valve E causes the bridge cylinders 15 to lower the bridge until positive stops 27 are contacted.

As the bridge 14 moves downwardly, limit switch J is actuated to operate the valve K which causes the cylinder 21 to be actuated to lower the plunger 12. The plunger thereby presses the desired beam clearance area of the funnel member. The speeds of operation are such that the bridge 14 has fully descended and is resting on the stops 27 before the plunger 12 presses the glass. This eliminates any relative motion of the plunger 12 with respect to the glass which might be caused if the bridge motion were erratic. The drop timer G is set up to complete its drop after the plunger 12 has pressed the glass thereby establishing the dwell time. When the drop timer G has fully descended, it operates a limit switch M which returns valve K and retracts the pressing cylinder 21 before the bridge is raised off the stops 27. The machine timer resets valve E causing the bridge cylinders 15 to lift the bridge to its upper position after the plunger has been retracted so that the machine is thereby in position for indexing of the mold table 10. This completes the cycle of operation.

I claim:
1. In an apparatus for making a cathode ray tube funnel member or the like from a molten glass gob introduced into a rotatable centrifugal mold, the improvements comprising
an elongated bridge overlying the mold,
means supporting said bridge at the ends thereof for vertical displacement relative to the mold,
positive stop means for limiting the downward movement of each end of the bridge toward the mold,
a pressing plunger,
means for mounting said pressing plunger on said bridge for movement with said carriage vertically,
and means for moving said plunger vertically independently of said bridge whereby said plunger can be moved downwardly after said bridge engages said positive stop means.
2. The combination set forth in claim 1 including a carriage movable longitudinally on the bridge,
said pressing plunger being mounted on said carriage by said mounting means.
3. The combination set forth in claim 2 including means for moving said carriage longitudinally on said bridge.
4. The combination set forth in claim 3 including means for moving said improvements cyclically such that said carriage is first moved in overlying relationship with the mold, the bridge is thereafter moved downwardly against said stop means, and finally the pressing plunger is moved downwardly independently of the bridge to press a portion of the glass gob.
5. The combination set forth in claim 1 wherein said stop means are adjustable vertically.
6. The combination set forth in claim 1 wherein said means for moving said plunger independently comprises a hydraulic cylinder.
7. The combination set forth in claim 1 wherein said means for supporting said bridge comprises vertical columns along which said bridge is vertically slidable.
8. The combination set forth in claim 7 including hydraulic means at each end of said bridge for moving said bridge vertically.
9. In an apparatus for making a cathode ray tube funnel member or the like from a molten glass gob introduced into a rotatable centrifugal mold, the improvement comprising
a pair of support columns,
an elongated bridge vertically slidable on said support columns and overlying the mold,
fluid operated means on said columns and connected to said bridge for raising and lowering said bridge,
positive stop means on said columns for engaging and stopping the downward movement of the ends of said bridge on said columns,
a carriage mounted on said bridge for horizontal movement thereon into and out of position overlying said mold,
fluid operated means on said bridge for moving said carriage on said bridge,
a pressing plunger,
fluid operated means for mounting said plunger on said carriage for movement vertically relative to said carriage and said bridge,
whereby when said carriage is in overlying relationship to said mold, said bridge may be moved downwardly against said positive stop means and said plunger may thereafter be further moved downwardly independently of the bridge to press a portion of the glass gob.
10. The combination set forth in claim 9 including means for moving said improvements cyclically such that said carriage is first moved in overlying relationship with the mold, the bridge is thereafter moved downwardly against said stop means, and finally the pressing plunger is moved downwardly independently of the bridge to press a portion of the glass gob.
11. The combination set forth in claim 9 including adjustable stop members movable with said bridge for engaging said stop means.

References Cited
UNITED STATES PATENTS 3,150,951    9/1964    Mayhew    65—302 X
3,151,968    10/1964    Waller    65—302 X DONALL H. SYLVESTER, *Primary Examiner.*

ARTHUR D. KELLOGG, *Assistant Examiner.*

U.S. Cl. X.R.
65—309, 316, 322